United States Patent [19]

Lemanski

[11] 4,081,873
[45] Apr. 4, 1978

[54] SELF-DECOUPLING TAP AND DIE HOLDER

[76] Inventor: Savarian F. Lemanski, 109 Taylor, Detroit, Mich. 48202

[21] Appl. No.: 812,666

[22] Filed: Jul. 5, 1977

Related U.S. Application Data

[63] Continuation of Ser. No. 667,036, Mar. 15, 1976, abandoned.

[51] Int. Cl.² ............................ B23G 5/12; B23G 5/16
[52] U.S. Cl. .................................... 10/89 H; 10/89 F; 10/141 H; 408/139; 408/141; 408/142
[58] Field of Search ...................... 10/89 F, 89 H, 106, 10/107 F, 123 R, 129 R, 139 R, 141 H; 64/23; 408/125, 129, 132, 127, 139, 141, 142, 221

[56] References Cited

U.S. PATENT DOCUMENTS

| | | | |
|---|---|---|---|
| 713,004 | 11/1902 | Hunter | 408/139 |
| 770,966 | 9/1904 | Hunter | 408/139 X |
| 3,135,980 | 6/1964 | Swanson et al. | 10/106 X |
| 3,189,923 | 6/1965 | Smyth | 10/89 H |
| 3,214,773 | 11/1965 | Benjamin et al. | 408/142 |
| 3,305,882 | 2/1967 | Rodier | 408/110 |
| 3,829,230 | 8/1974 | Johnson | 408/142 |

FOREIGN PATENT DOCUMENTS

| | | | |
|---|---|---|---|
| 50,860 | 5/1910 | Switzerland | 10/89 H |

Primary Examiner—E. M. Combs
Attorney, Agent, or Firm—Whittemore, Hulbert & Belknap

[57] ABSTRACT

The holder is intended for fixed application to the tail stock of a lathe, or equivalent machine tool, to optionally mount a die or tap for externally or internally threading a workpiece carried on the rotating headstock end of such machine tool. Thus mounted and adjustably pre-set, the holder automatically decouples operationally from the workpiece after a predetermined axial length of threading has been cut on the work part, thus causing the latter to rotatively overrun the tap or die on the holder.

3 Claims, 6 Drawing Figures

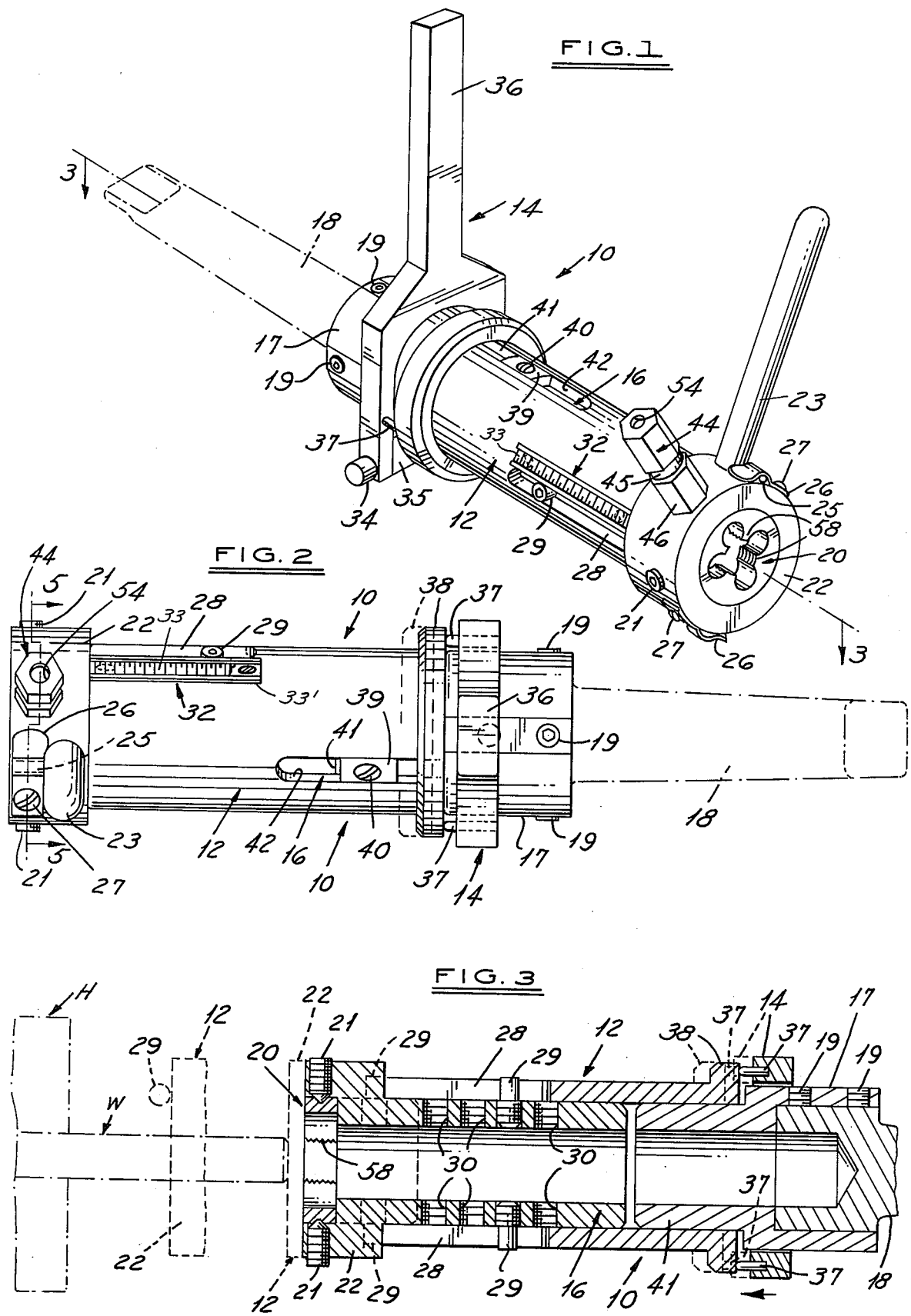

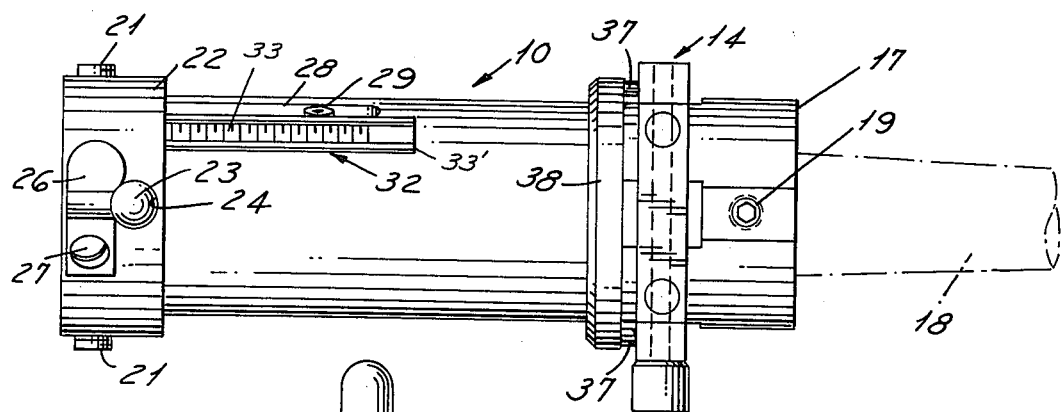
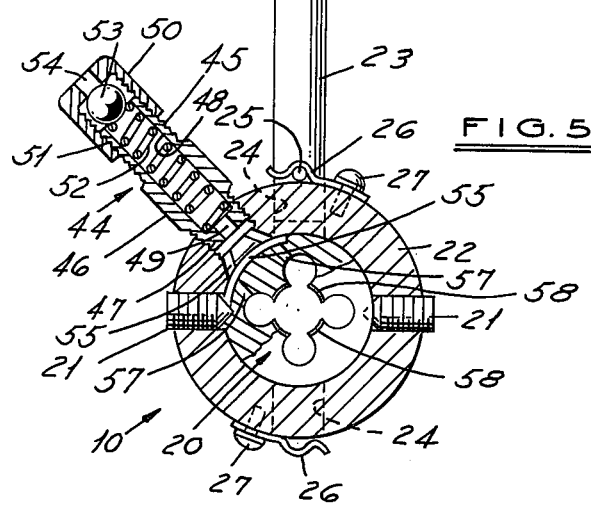
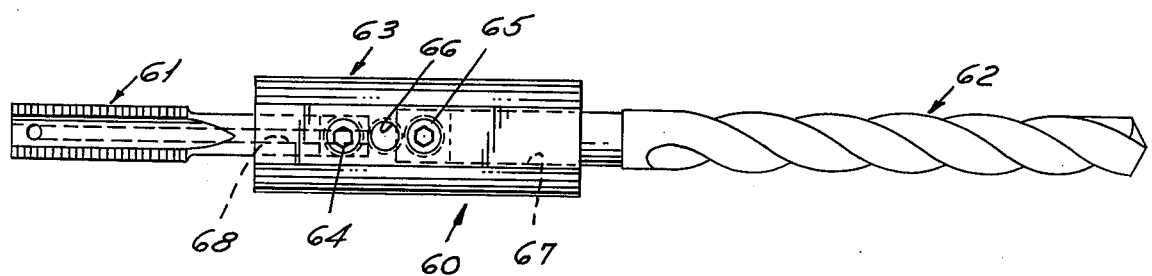

SELF-DECOUPLING TAP AND DIE HOLDER

This application is a continuation of my application Ser. No. 667,036, filed Mar. 15, 1976, now abandoned.

BACKGROUND OF THE INVENTION — FIELD

The holder is intended for use in the making of threads on or in many types of cylindrical-section workpieces. As such, it should supplant the only current practice of which I am aware, namely the tripping of an entire threading machine as the threading cutter thereof or the workpiece move axially and predeterminedly relative to one another.

SUMMARY OF THE INVENTION

The tool fixedly mounts at one axial end thereof a threading die or tap, having leak-proof provision for necessary lubrication of such tool cutter or bit as work goes on. A cylindrical inner body member of the tool slidably mounts an external sleeve, said body member carrying a radially outwardly projecting drive pin which slides in an axially disposed through-slot in an end of the external sleeve, said slot opening axially outwardly through said sleeve end, and when the desired length of thread has been cut on the work, the pin will have been advanced sufficiently, due to the axial threading motion of the holder's tap or die, to depart from the slot end. The body member of the holder, thus lacking drive by said drive pin, idles rotatively in the external sleeve, signalling visibly that the work threading is completed. The axial length of the thread may be adjusted as desired by an optional setting of the drive pin lengthwise relative to the slot of the external sleeve part. A shipper-type lever is pivotally mounted on the inner body member, being operable to shift the sleeve into an initial biting engagement with the die or tap with the work, thus to insure an instant start of threading when the work is rotated for threading. A capstan rod on said sleeve assists the operator in making said engagement.

BRIEF DESCRIPTION OF THE DRAWINGS

FIG. 1 is a perspective view of the holder as applied to a standard tapered shank tail stock mount, said mount appearing in dot-dash line and the view showing the holder carrying a threading die;

FIG. 2 is a top plan view of the holder of FIG. 1 in a decoupled or retracted setting thereof prior to engagement with a workpiece, a preliminary pre-threading position being suggested in dotted line;

FIG. 3 is a view in vertical section in the plane 3—3 of FIG. 1, the retracted setting and the advanced preliminary work-engaging setting of the holder appearing respectively in solid and dotted line, with a work part to be externally diethreaded appearing in dot-dash line, and further with a part of the holder also shown in dotted line in its lefthand decoupled, overrun position relative to the remainder of the holder after threading has been completed;

FIG. 4 is a bottom plan view of the holder as applied to a tail stock support which is shown in dot-dash line;

FIG. 5 is a view partially broken away and in transverse cross-section on line 5—5 of FIG. 2; and FIG. 6 is an elevation showing a threading tap as combined with a drill bit for use in the improved tool holder in the formation of internally threaded bores in a workpiece.

DESCRIPTION OF A PREFERRED EMBODIMENT

The holder of the invention, as generally designated 10, comprises an outer steel tubular member or sleeve 12 equipped with a pivotal starter 14 (later described in detail), and a cylindrical inner steel mounting body 16. This body is axially and outwardly flanged or flared at 17, where it is adapted to telescopingly receive a standard Morris taper shank mount 18 to be gripped on the tail stock, not shown, of a lathe. Set screws 19 releasably lock the mount 18 in body flange 17. FIG. 3 shows the holder as optionally equipped at its opposite end with a threading die 20 fitted and held by set screws 21 in a thickened boss 22 of inner body 16, with said die operating on a bar or other workpiece W gripped for machining rotation in a head stock H of the lathe. This is a typical installation of the holder 10; however, it should be understood that installations on other conventional machine tools are contemplated by me.

A capstan piece 23 is removably mounted in one of two opposite radial bores 24 of the boss 22 to facilitate manual turning of the holder in solid initial engagement of the die 20, or other thread-cutting bit or tap, with the work, but the capstan will then ordinarily be removed. Should this not be desired or needed, the capstan 23 may be equipped with a small radial pin 25 receivable beneath one of two spring retainer clips 26, each mounted by a screw 27 on the holder boss 22. Appropriate lubricating means are provided at this end of the holder, and are later described.

As best shown in FIG. 3, the outer sleeve 12 is formed with a pair of elongated, diametrically opposite slots opening through the lefthand end thereof and each of these slots slidingly receives a drive pin 29. These pins are two in number and are of the nature of Allen set screws threaded into radially opposite openings 30 in the wall of inner holder member 16; and by preference there are several pairs of such tapped openings 30, four pairs being illustrated for selective settings of the pins 29.

Thus the outer sleeve 12 is drivingly pin-and-slot connected to the inner body member 16, so that with the latter fixedly mounted to the machine tail stock and the die 20 properly in thread-chasing engagement with the work part W, per FIG. 3, the rotation of said part by head stock H will cause the part to draw the sleeve 12 to the left under a self-derived screw drive.

This axial operative tapping motion continues until the pair of drive pins 29 reach and exit from the lefthand (FIG. 3) end of the outer sleeve slots 28, at which time the pins depart axially from said slots and have free wheel-type idling engagement at the end of outer sleeve member, as suggested in lefthand dotted line. The holder 10 then is at rest, visibly signalling that the threading is at an end, i.e., that the head stock H has completed its necessary rotation to free workpiece W from die 20, and that the tool holder 10 is ready to thread another part.

The provision of several pairs of diametrically opposed drive pin receiving openings 30 in the holder body member 16 enables optional settings of the pin pairs 29, thus providing for selective lengths of threading before the die 20 decouples from the workpiece in the manner just described. The use of dual pins 29 minimizes any wracking tendency and halves the torque load on each pin.

Suitable appropriately calibrated scale devices 32 adjacent and paralleling the sleeve slots 28 assist the user in a desired setting of the pins 29 relative to the thread chaser 20. Each such device comprises a thin steel scale 33 removably slidable in an undercut groove of a holder 33'screwed onto the sleeve 12, the scale 33 being calibrated on its opposite sides, for optional reference, in metric system indications and in linear measurement marks of the presently more common system.

The manually operated shipper lever 14 is an important aid in the initial shifting of outer holder sleeve 12, just prior to the start of tapping, from a retracted position to the dotted line workpiece-engaging position (FIG. 3) immediately to the left of threading die 20. This motion, accompanied at its end by a slight capstan-assisted rotation of said sleeve 12, gets the die 20 in a firm starting engagement with the work rod W.

Thus, with special attention to FIG. 3 as supplemented by FIGS. 1, 2 and 4, the lever 14 is shown with a pivotal connection by an elongated headed transverse pin piece 34 to an integral rectangular boss 35 (FIG. 1 only) adjacent the bottom of the enlargement 17 of inner body member 16. Lever 14 is equipped with an integral operating arm 36 and carries a pair of diametrically opposed, forwardly projecting pins 37.

These pins are engaged, in the inoperative retracted position of the holder's outer sleeve member 12, with an enlarged rear radial flange 38 on said member, so that when the shipper 14 is operated forwardly, or to the left, as in FIG. 3, pins 37 shift sleeve 12 into initial, thread-starting engagement with the work rod W; and a partial manual rotation of that sleeve, assisted by the capstan piece 24, usually effects a solid tapping engagement of die 20 with the rod. The capstan may then be removed if desired. The axial extent of such starting movement is governed by a lug 39 secured by a screw 40 on an axially extended tubular forward nose 41 of the tail stock-engaged part 17 of holder 10. Lug 39 moves in an elongated slot 42 of the outer sleeve 12 and is in effect an integral radial extension of said part, relied on solely in pre-setting the holder, usually once and for all.

FIG. 5 shows the tapping die 20 as being lubricated by an oil fitting 44, reference also being directed to FIGS. 1 and 2. Fitting 44 comprises an outer threaded tubular casing 45 having a radially inner hex formation 46 which it is screwed into tight leak-resistant place into a radial bore 47 in part 22 of the holder 10. The cylindrical interior 48 of the fitting bottoms over an axial inner port 49 of the fitting 44, and the latter's opposite end is covered by a centrally vented cap 50 adjustably threaded at 51 on the outer fitting end above its hex 46.

An appropriately biased coil compression spring 52 seats downwardly in fitting casing 45, outwardly sustaining a seal-off ball 53 which is centered just inwardly of the vent port 54 of cap 50. An oil can spout will temporarily deflect the ball 53 for the entry of lubricant to the fitting interior 48. The forward die-receiving boss part 22 of outer sleeve 12 has a pair of passages 55 which communicate its threaded bore 47 inwardly with the cylindrical space of part 22 which is occupied by the die 20; and said die is specially formed with an external arcuate groove 56 exposed to those passages. The die also has a pair of circumferentially spaced ports 57 connecting its groove 56 with its interior where its thread-chasing teeth 58 operate; and the die is held in proper circumferential location of ports 57 relative to oiler fitting 44 by one of the forward set screws 21.

Otherwise the die 20 is a conventional one; and when desired or necessary the oil fitting cap 50 may be screwed down sufficiently to seat its vent on ball 53, causing the latter to engage on and seal off the outer end of fitting chamber 48. Oil leakage when not in use is thereby prevented.

FIG. 6 illustrates a combination cutter tool, generally designated 60, including a special tap 61 for an internal workpiece threading operation, and a twist drill bit 62 sized to make a bore appropriate for said operation. These cutters are coaxially mounted in an axial bore through a connecting adapter piece 63, being held in place by set screws 64, 65 and the adapter has a further tapped radial bore 66 open inwardly to the adapter's bore 67, which radial bore is adapted to receive an oiler unit, not shown but similar to the oiler fitting 44 of FIG. 5.

The tap 61 is specially provided with a central axial passage 68 through a major portion of its length, and with one or more radial ports outwardly communicating said axial passage with the exterior of the tap between cutting flutes thereof. Said oil passage opens within the adapter bore, where it receives lubricant as metered by a fitting of the type previously described.

I claim:

1. A holder for a thread-forming tool, comprising a pair of coaxially telescoped members axially movable relative to one another, one of which members has means to mount said tool, said members having a torque-transmitting connection to one another enabling a predetermined relative axial slide of said members as said tool is threadingly engaged with a workpiece over a predetermined time interval, said connection being automatically discontinued after said interval whereby the tool-mounting member and workpiece have relative overrunning rotation, said torque-transmitting connection comprising a radially extending element on one member and an axially extending radial slot of predetermined length in the other member which effectively opens at an end of the latter, the discontinuance of the connection occurring as said element reaches and departs the open end of said slot, and a plurality of longitudinally spaced opening means in said one member to receive and position said radially extending element at plural positions lengthwise of said slot to adjust the duration of said time interval, thus to vary the axial length of a thread formed by the tool.

2. A holder as defined in claim 1, further characterized in the provision of structure on said one member having means to mount said tool for lubricating said tool, said structure including a reservoir for lubricant, said reservoir having a fill opening, spring urged valve means normally closing said fill opening, said valve means being deflectable to permit filling of the reservoir with lubricant, and passage means connecting said reservoir with said tool for the flow of lubricant to the tool.

3. A holder unit as defined in claim 1, further characterized in the provision of a manually engageable starter unit releasably engageable with one of said telescoped members of the pair, said starter unit including a pivotally mounted member including means contactable with said one telescoped member for axially advancing said holder unit into work engaging position upon pivoting thereof.

* * * * *